(12) United States Patent
Rasel et al.

(10) Patent No.: US 10,464,538 B2
(45) Date of Patent: Nov. 5, 2019

(54) DEVICE AND METHOD FOR ADAPTIVE ANTI-SKID CONTROL

(71) Applicant: KNORR-BREMSE SYSTEME FÜR SCHIENENFAHRZEUGE GMBH, Munich (DE)

(72) Inventors: Thomas Rasel, Höhenkirchen-Siegertsbrunn (DE); Reinhold Mayer, Karlsfeld (DE)

(73) Assignee: Knorr-Bremse System Fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 15/765,901

(22) PCT Filed: Sep. 27, 2016

(86) PCT No.: PCT/EP2016/072964
§ 371 (c)(1),
(2) Date: Apr. 4, 2018

(87) PCT Pub. No.: WO2017/060126
PCT Pub. Date: Apr. 13, 2017

(65) Prior Publication Data
US 2018/0281759 A1    Oct. 4, 2018

(30) Foreign Application Priority Data
Oct. 5, 2015    (DE) .......... 10 2015 116 862

(51) Int. Cl.
*B60T 8/17* (2006.01)
*B60T 8/1761* (2006.01)

(52) U.S. Cl.
CPC ........ *B60T 8/1705* (2013.01); *B60T 8/17616* (2013.01)

(58) Field of Classification Search
CPC ............... B60T 13/665; B60T 2210/12; B60T 2270/413; B60T 8/3235; B60T 8/58; B61H 9/00
See application file for complete search history.

(56) References Cited

U.S. PATENT DOCUMENTS

| 9,221,476 B2 * | 12/2015 | Breuer | B60T 8/1705 |
| 2002/0088673 A1 * | 7/2002 | Malac | B60T 8/1705 188/1.11 R |

(Continued)

FOREIGN PATENT DOCUMENTS

| DE | 4333281 A1 | 3/1995 |
| DE | 102006057813 A1 | 6/2008 |

(Continued)

OTHER PUBLICATIONS

Search report for International Patent Application No. PCT/EP2016/072964; dated Jan. 19, 2017.

(Continued)

*Primary Examiner* — Thomas G Black
*Assistant Examiner* — Ce Li Li
(74) *Attorney, Agent, or Firm* — Barnes & Thornburg LLP

(57) ABSTRACT

A device and a method for adaptive activation of a brake system of a rail vehicle are provided, wherein the brake system is controlled according to a predetermined first and second slip parameter range, wherein the first slip parameter range is a macro slip range with a higher permissible slip range, and the second slip parameter range is a micro slip range with a lower permissible slip range, and wherein a maximally available brake force in the micro slip range and an average brake force of the brake system achieved in the current slip range are determined.

11 Claims, 4 Drawing Sheets

(56) References Cited

U.S. PATENT DOCUMENTS

| | | | | |
|---|---|---|---|---|
| 2008/0116739 A1* | 5/2008 | Lang | ................... | B60T 8/1705 |
| | | | | 303/15 |
| 2010/0292875 A1* | 11/2010 | Gross | ................... | B60T 8/1705 |
| | | | | 701/19 |
| 2013/0261924 A1* | 10/2013 | Herden | ................ | B60T 8/1705 |
| | | | | 701/81 |
| 2013/0338860 A1* | 12/2013 | Herden | ................ | B60T 8/1705 |
| | | | | 701/20 |
| 2014/0163785 A1* | 6/2014 | Kawada | ................ | B61C 17/12 |
| | | | | 701/20 |
| 2014/0303817 A1* | 10/2014 | Mayer | ................. | B60T 8/1705 |
| | | | | 701/19 |
| 2014/0371959 A1* | 12/2014 | Kumar | ................. | B60T 13/665 |
| | | | | 701/20 |

FOREIGN PATENT DOCUMENTS

| | | |
|---|---|---|
| DE | 102011113072 A1 | 3/2013 |
| DE | 102011113117 A1 | 3/2013 |
| EP | 0716001 A1 | 6/1996 |
| EP | 2147840 A1 | 1/2010 |
| EP | 2753508 A2 | 7/2014 |
| RU | 2381927 C2 | 2/2010 |
| WO | 2006113954 A1 | 11/2006 |
| WO | 2008067858 A1 | 6/2008 |
| WO | 2013034714 A2 | 3/2013 |

OTHER PUBLICATIONS

Russian Search Report corresponding to Russian Application 2018114920/11, dated Dec. 7, 2018.

* cited by examiner

DEVICE AND METHOD FOR ADAPTIVE ANTI-SKID CONTROL

CROSS-REFERENCE AND PRIORITY CLAIM

This patent application is a U.S. National Phase of International Patent Application No. PCT/EP2016/072964, filed Sep. 27, 2016, which claims priority to German Patent Application No. 10 2015 116 862.6, filed Oct. 5, 2015, the disclosures of which are incorporated herein by reference in their entirety.

FIELD

Disclosed embodiments relate to a device and to a method for adaptively actuating a brake system of a rail vehicle by means of an anti-skid control function which prevents locking of a wheel of the rail vehicle under unfavorable adhesion conditions in the wheel-rail contact.

BACKGROUND

Anti-skid systems for rail vehicles carry out a similar function to an anti-lock braking system (ABS) of a motor vehicle. During the braking of a rail vehicle, a sudden stationary state of the axle, which can result in a flat point in the wheel tire which worsens the true running in the case of extended braking distance, can occur in the contact face between the wheel and the rail owing to changing adhesion conditions. A significant function of anti-skid systems is to prevent the stationary state of the axle during the braking operation, for example by suitable automatic evacuation and aeration of a pneumatic brake cylinder.

For the purpose of braking, the driver of the traction vehicle applies the brake control pressure, as a result of which after a short time a corresponding brake cylinder pressure is set in the pneumatic brake cylinders at the wheel sets. As a result of the braking torque which is introduced in this way the wheel set is decelerated, resulting in slip between the wheel and rail at the wheel contact faces. The slip is defined in the case of braking as follows:

$$s=(v-R\omega)/v,$$

where s characterizes the slip, $v$ characterizes the vehicle speed, $\omega$ characterizes the axle speed and R characterizes the nominal wheel radius. The friction force which decelerates the rail vehicle is the product of the adhesion loading which is dependent on the slip and the wheel contact force. As the slip increases, the adhesion loading rises steeply and drops slowly after a maximum value has been reached. The maximum value of the adhesion depends here on various influencing factors, inter alia on the weather conditions and the state of the rail. In the case of a smooth rail or a rail which is covered with fall foliage, it is particularly low. In the case of slip-free travel there is no adhesion loading present.

In the case of a rail vehicle, the achievable braking force or traction force is therefore proportional to the available adhesion between the wheel and the rail. The maximum available adhesion with the associated wheel slip depends here on a multiplicity of parameters. According to the current prior art, as is described e.g. in DE 10 2006 057 813 A1, essentially two slip ranges can be differentiated. On the one hand adhesion conditions which require a high wheel slip, such as is usual e.g. in the case of tests with respect to the Standard UIC 541-05 of the International Railway Association (Union internationale des chemins de fer (UIC)) in the case of aqueous intermediate layers. On the other hand, a small wheel slip if the intermediate layers are composed e.g. of fall foliage or oily substances.

An anti-skid system or a traction control system is therefore intended to set the suitable wheel slip in order to maximize the adhesion. Conventional anti-skid systems which are approved according to UIC 541-05 adjust a typical wheel slip in the slip range which is permissible by the UIC541-05. This slip range is matched to the test conditions defined in the standard, with a water-soap mixture as the adhesion. In the abovementioned DE 10 2006 057 813 A1 two different adjustment ranges are differentiated empirically on the basis of travel tests and travel mode. A normal slip range (<30%) and a low slip range (<5%). Switching over between the two slip ranges occurs depending on the time of year (fall), as a result of insufficient deceleration power in the case of high wheel slip or as a result of the evaluation of wheel set decelerations.

In further anti-skid methods, for example a model-based approach is pursued in which properties of the intermediate medium present in the wheel-rail contact are identified and the optimum wheel slip which is necessary to achieve the maximum adhesion is derived from these properties. It has also been proposed to set the slip to the adhesion maximum on the basis of axle-based measurement of the adhesion-slip relationship. Another approach is based on not carrying out adaptation for the wheel slip and instead adjusting 50% of the axles to the standard slip range (according to UIC 541-05), and the remaining 50% to an alternative small slip range.

Conventional anti-skid systems according to the prior art are optimized essentially to one type of adhesion. Adaptation to different conditions does not take place. If the current adhesion requires a small or very small wheel slip, the axles operate with non-optimum wheel slip. In the case of adaptation of the slip range, vehicle-specific parameters (such as acceleration, mass, force, etc.) have to be taken into account. There is no relatively detailed explanation of the exiting of the state of low deceleration (small slip). Singular brief deviations in the wheel set acceleration can lead to misinterpretations of the suitable slip range. A multiplicity of parameters and/or characteristic diagrams with reference data are usually required to determine the relationships between the adhesion and slip which are necessary to decide the slip range. In systems in which the estimation about the suitable wheel slip of the entire system is based on the feedback about an individual axis, a precondition is that a similar type of adhesion is present at all the axles.

The adaptation-free approach which was mentioned last above constitutes a compromise. It provides the advantage that it is not necessary to know parameters relating to the rail vehicle and it supplies a defined constant wheel slip distribution. Therefore, a maladaptation can be avoided. However, as a result, only 50% of the axles operate in the suitable slip range. The available system braking force is therefore larger than that of a mal-adapted system but smaller than that of a correctly adapted system.

SUMMARY

Disclosed embodiments, therefore, are based on the object of making available an anti-skid system with an improved adaptation effect.

BRIEF DESCRIPTION OF FIGURES

Further advantages, features and application possibilities of the disclosed embodiments are apparent from the following description with reference to the appended figures in the drawings, in which.

DETAILED DESCRIPTION

Figure 1:
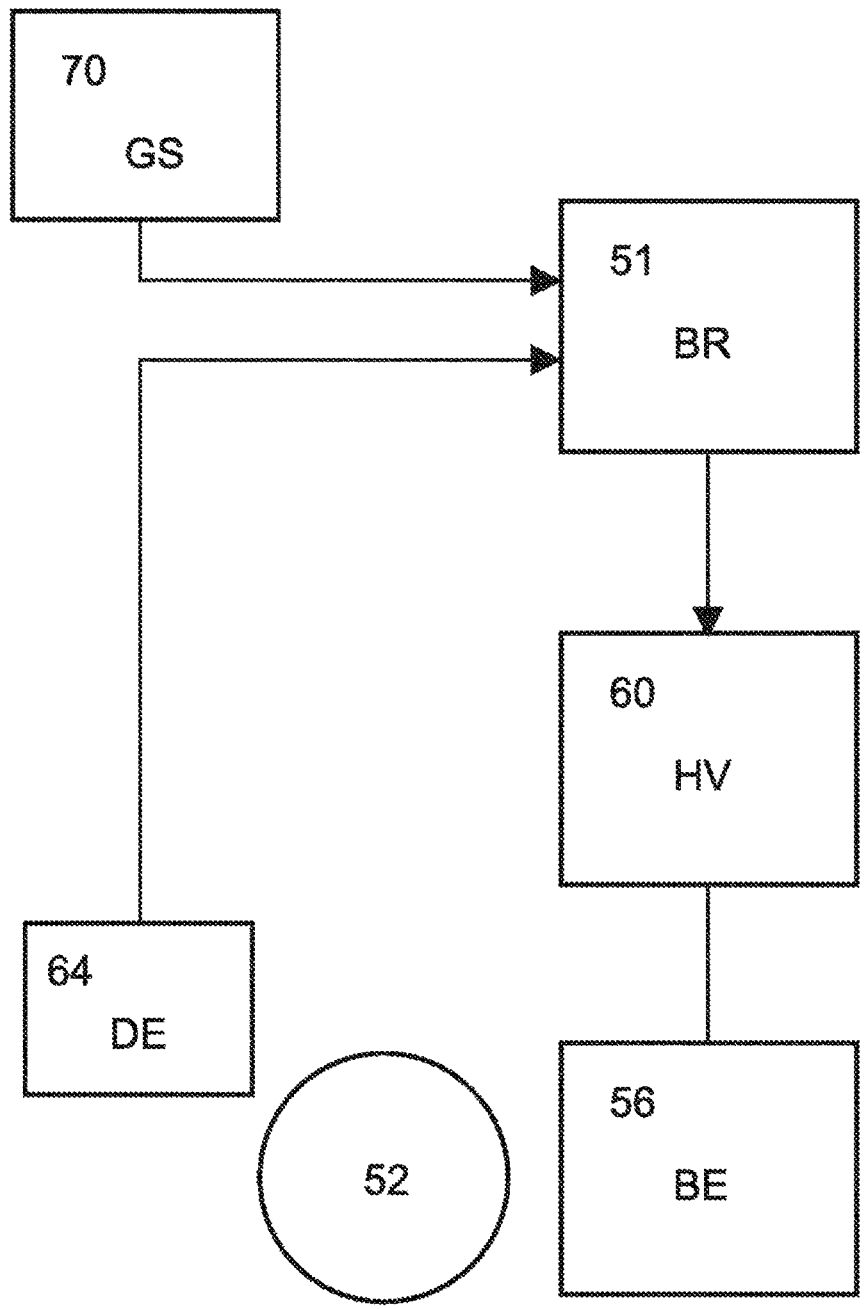
FIG. 1 shows a schematic block diagram of a pneumatic brake system with anti-skid control in which the disclosed embodiments can be used.

In order to achieve the object, a device and a method for adaptively actuating a braking force system of a rail vehicle are proposed, wherein the brake system is controlled in accordance with a predetermined first and second slip parameter range, wherein the first slip parameter range is a macroslip range with a relatively high permissible slip range, and the second slip parameter range is a microslip range with a relatively low permissible slip range, and wherein a maximum braking force which is available in the microslip range and an average braking force of the brake system which can be achieved in the current slip range are determined. A transition from the macroslip range into the microslip range is brought about if a comparison of the determined average braking force in the macroslip range with the maximum braking force available in the microslip range indicates an insufficient slipping effect in the macroslip range. Alternatively, a transition from the microslip range into the macroslip range can also be brought about if a comparison of the determined average braking force in the macroslip range with the maximum available braking force in the microslip range indicates a sufficient slipping effect in the macroslip range.

When the anti-skid control is implemented using a computer device with a software-controlled processor, the claimed method can also be implemented as a computer program, wherein the computer program comprises code means for carrying out the steps according to patent claim 9 when the program is executed on the computer device.

An advantage with the described solution is that a closed procedure is proposed for anti-skid control, which procedure permits an automated transition from the microslip range into the macroslip range, and vice versa. As a result, the wheel slip can be continuously adapted to the present adhesion conditions. Owing to the averaging during the determination of the braking force, brief static fluctuations in the adhesion do not affect the estimation of the slip ranges. As a result of the use of averaged and filtered variables, average ("fuzzy") adhesion states and the changes therein are taken into account during control.

A costly correlation of the adhesion and the slip in order to assess suitable adjustment ranges is therefore not necessary. All the decisions about the slip ranges to be aimed at are based on comparisons of average braking forces and friction travel values. There is therefore no need for knowledge of the instantaneously present absolute forces. A signal which is proportional to the braking force is sufficient.

In principle, there is also no need for knowledge of parameters of the vehicle or of the brake components. If braking-force-proportional signals are used to differentiate forces, they may be correspondingly scaled. In a pneumatic brake system it is possible, for example, to use the averaged brake pressure as a measure of the braking force.

According to a first exemplary development, the device can be configured to bring about the comparison by the comparison means in response to achieving a predetermined friction travel. As a result it can be ensured that the comparison of the properties of the macroslip range with those of the microslip range does not take place until after the predetermined friction travel has been achieved, with the result that a more informative result can be obtained. The friction travel can be determined here, for example, in a way which is a product of the time and the differential speed between the wheel and the rail vehicle.

According to a second exemplary development, the device can be configured to leave, during a transition into the microslip range, at least one axle of the rail vehicle in the macroslip range as a test axle for a test phase. By virtue of this measure, the properties of the macroslip range can also be continuously detected in parallel after the transition into the microslip range, in order also to be able to perform, in the microslip range, a comparison between the properties of the macroslip range and the properties of the microslip range. The test phase of the test axle can be ended here after a predetermined introduced friction travel has been reached or after a maximum test time, in order as a result to obtain an informative value of the average braking force at the test axle which is operated in the macroslip range. The test phase can, however, also be continued, with the result that axles remain in the state of macroslip adjustment even after the macroslip test phase, and macroslip axles can therefore accumulate.

According to a third exemplary development, the device can be configured to actuate the slip range-setting means to end the macroslip range of the test axle if the average braking force at the test axle is lower than the maximum braking force which is available in the microslip range. The test axle is therefore operated only in the macroslip range as long as the average braking force thereof is higher than the maximum available braking force available in the microslip range.

According to a fourth exemplary development, the device can have further comparison means for comparing the average braking force of axles operated in the macroslip range with the average braking force of axles operated in the microslip range, and wherein the device causes the slip range-setting means to operate all the axles of the brake system in the macroslip range if the average braking force of the axles which are operated in the macroslip range exceeds the average braking force of the axles which are operated in the microslip range. In this context, the average braking force of the axles of a slip range can be determined, for example, by summing average braking forces of the respective axles of the slip range. According to the proposed anti-skid control, the macroslip range is accordingly not exited until a potential of the entire brake system which is improved compared to the current properties of the macroslip range is available in the microslip range. The average achievable braking force is obtained here, in particular in the microslip range, from the available adhesion with the potentially available force and the associated microslip adjustment. In the case of a low level of efficiency of the microslip adjustment, the microslip range is exited again.

According to a fifth exemplary development, the maximum force-determining means can be configured, for example, to determine the maximum braking force available in the microslip range at complete transition of the wheel-rail contact into the skidding phase by correlation with the force necessary for this purpose.

In the text which follows, exemplary embodiments are described using the example of an anti-skid adjustment for a pneumatic brake system of a rail vehicle.

FIG. 1 shows a schematic view of a brake system with a brake control device (BR) 51 in which the anti-skid adjustment according to the disclosed embodiments can be implemented with software control or in a hard-wired fashion. The brake system is provided for braking a multiplicity of wheels of a rail vehicle such as, for example, a wheel 52 which is shown in FIG. 1. For this purpose, a brake device (BE) 56 of the brake system is assigned to the exemplary wheel 52, as also to all the other wheels (not shown). A main control valve device (HV) 60 of the pneumatic brake system is connected to the brake control device 51. The brake control device 51 is provided for actuating the main control valve device 60 to make available a common brake pressure for the brake device 56 and the brake devices of other wheels. In addition, the brake device 56 has a brake valve arrangement which can be actuated by means of the brake control device 51 and which is capable of modifying the brake pressure made available by the main control valve device 60 in accordance with the brake control device 51. The brake pressure which is modified by the brake valve arrangement is applied, for example, to a pneumatic cylinder, serving as a force generator, of the brake device 56, in order to activate a wheel brake device, in this example a block brake (not shown in more detail). As a result, a desired brake pressure for braking the wheel 52 can be actuated by the brake control device 51. A wheel speed sensor (DS) 64 is provided for measuring the wheel speed of the wheel 52 and feeding a corresponding signal to the brake control device 51 via a suitable connection. During operation, the brake control device 51 detects corresponding rotational speed data of the wheel 52 by means of the wheel speed sensor 64. The brake control device additionally detects the velocity of the rail vehicle via a connection to an optimum speed sensor 70. The brake control device 51 determines the actual wheel slip of the wheel 52 therefrom.

On the basis of the known actual slip of the wheel 52, the brake control device actuates the brake device 56 in such a way that at least at the start of a braking process the wheel 52 is adjusted to the desired slip set point value range. The data of the rotational speed sensor 64 is used for the adjustment. The brake control device 51 can also be connected to a brake pressure sensor device (not shown) which detects a main brake pressure which is present at the main control valve device 60 and/or a brake pressure which is effective individually at the brake device 56 and transmits it to the brake control device 51. It is also possible to provide that the brake control device 51 determines the velocity from the rotational speeds of a plurality of wheels.

Figure 2:
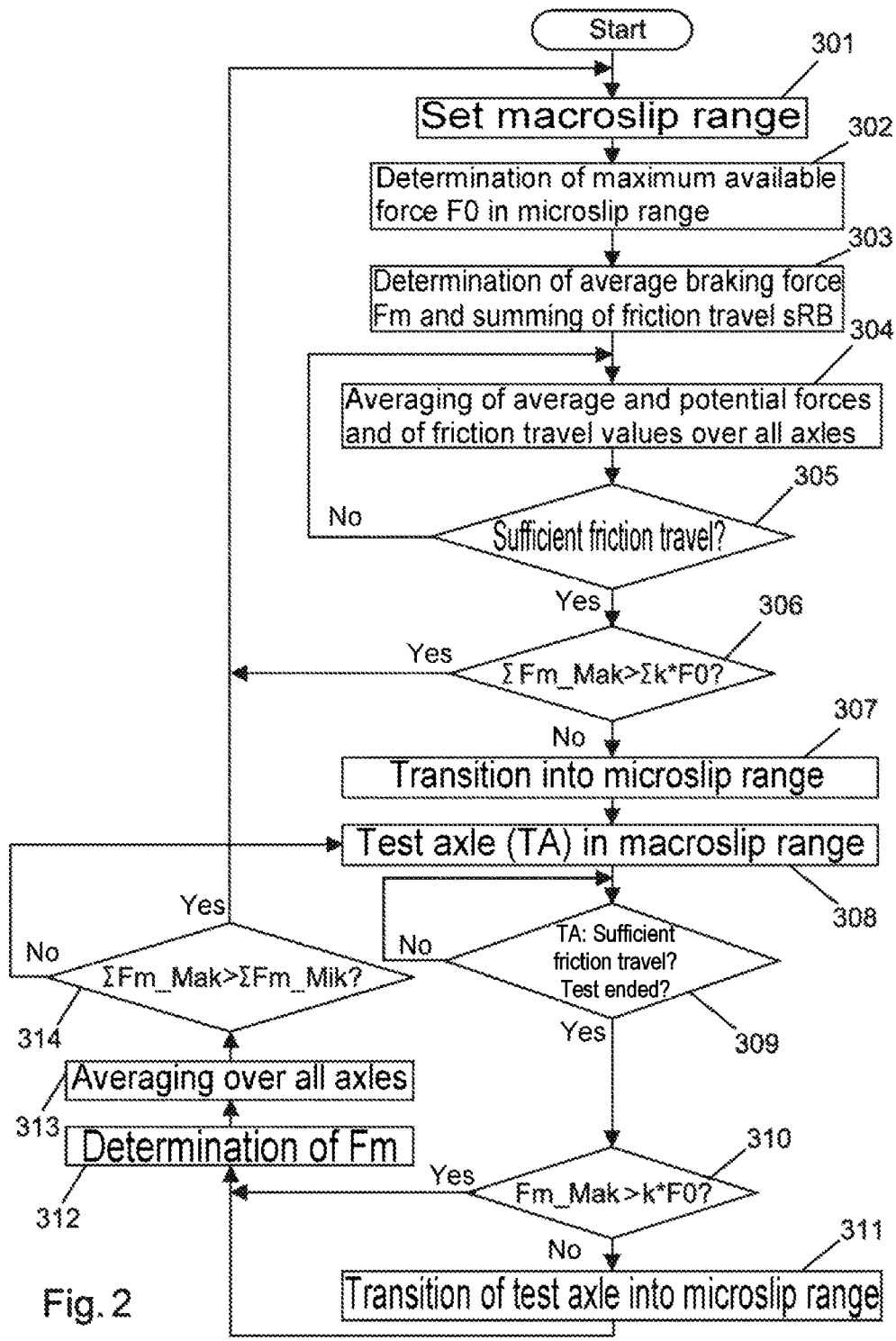
FIG. 2 shows a flowchart with anti-skid control according to a first exemplary embodiment.

FIG. 2 shows a flowchart of an adaptive anti-skid adjustment according to the first exemplary embodiment such as can be implemented, for example, in the abovementioned brake control device 51 according to FIG. 1. As already mentioned, the adaptive anti-skid adjustment can be implemented with software control or in a hard-wired fashion.

After the start of the sequence, firstly in step 301 the macroslip range is set for the adjustment process. Then, in step 302 the maximum braking force available in the microslip range is determined at the complete transition of the wheel-rail contact point into skidding, for example by correlation with the force which is necessary for this purpose, and is stored as a potentially available force F0 of the microslip range. In the following step 303, the average braking force is determined by filtering and/or averaging of the force realized by the anti-skid or traction control. In the further profile of the control, the average braking force can be a result of a macroslip adjustment (then characterized as "Fm_Mak") or a microslip adjustment (then characterized as "Fm_Mik"). The average braking force Fm_Mik in the microslip range does not necessarily correspond here to the potentially available force F0 in the microslip range. It results from the interplay between the adhesion which is present and the properties of the microslip adjustment function, and therefore at the same time includes the efficiency level of the microslip adjustment.

Furthermore, in step 303 a friction travel sRB is also summed, for example, as a product of the differential speed between the wheel speed and the vehicle and the time. Of course, the friction travel can also be determined in a suitable way other than as a slip which is summed in a time-dependent fashion.

The axle-specific or wheel-specific average forces Fm_Mik or Fm_Mak and potential forces F0 as well as the introduced friction travel values are then averaged once more over the system in step 304. The decision about remaining in the macroslip range is therefore based on the entire system state (characterized by the symbol "Σ") and not on the properties of individual axles or wheels.

In step 305 it is then detected whether an overall friction travel ΣsRB of the system which is sufficient for the reliability of the decision about remaining in the macroslip range has been introduced. If not, the sequence jumps back to the step 304 and the summing of the friction travel is continued. If a sufficient overall friction travel ΣsRB of the system has been detected in step 305, in step 306 an evaluation takes place as to whether the macroslip control and the adhesion are harmonized. This takes place by virtue of the fact that the average system braking force ΣFm_Mak which is achieved in the macroslip range and the system force ΣkF0 which is potentially available in the microslip range and is evaluated with a factor k (e.g. 0.5<k<1.5 or the like) are compared.

Given a sufficient macroslip effect, i.e. if the average system braking force ΣFm_Mak which is achieved in the macroslip range is greater than the system force ΣkF0 which is potentially available in the macroslip range and is evaluated, the sequence jumps back to the step 301 (as an alternative to step 302) and the macroslip range is maintained.

Otherwise, given an insufficient macroslip effect, i.e. if the average system braking force ΣFm_Mak which is achieved in the macroslip range is not greater than the system force ΣkF0 which is potentially available in the microslip range and is evaluated, the transition of the system into the microslip range occurs in step 307. In this context, all the axles are firstly adjusted to the microslip range. In a manner deviating therefrom, in step 308 it is always optionally possible to keep at least one of the axles in the state of the macroslip adjustment as a text axle (TA) during a test phase. In the subsequent step 309, the friction travel of the test axle is summed and it is checked whether a sufficient friction travel sRB of the text axle has been introduced in the test phase. If not, the step 309 is repeated until a sufficient friction travel has been introduced. The test phase of the test axle is then ended after the detection of a sufficiently introduced friction travel, and the sequence proceeds to step 310.

By comparing the average axle-related braking force of the test axle, determined in the interim, with the force kF0 which is potentially available in the microslip range and evaluated, it is detected in step 310 whether the adhesion effect of the test axle in the macroslip range is sufficient. If this is the case, the sequence proceeds to the step 311. In the case of an insufficient adhesion effect in the macroslip range, i.e. if the average braking force Fm_Mak of the test axle which is achieved in the macroslip range is not greater than the potentially available force F0 in the microslip range, the sequence proceeds to step 311 where a transition of the test axle into the microslip range takes place.

After the end of the macroslip test in step 309, the axle can also decide independently, according to corresponding criteria, about remaining in the macroslip range or returning to the microslip range. The axle for the next macroslip test can then be selected from the "pool" of the remaining microslip-adjusted axles. Therefore, despite the microslip system state one or more axles are then in the macroslip adjustment state.

Finally, the sequence proceeds to step 312 in which in turn the average braking force is determined by filtering and/or averaging the force which is implemented by the anti-skid control or traction control. The axle-specific or wheel-specific average forces Fm_Mik and Fm_Mak are then averaged once more over the system in step 313. Finally, in step 314 the achieved average system braking force of the axles is then compared in the microslip range with those of the axles in the macroslip range. If the mean value of the braking forces of the axles in the macroslip range exceeds that of the axles in the microslip range, the sequence jumps back to the step 301 and the system changes again to the macroslip range. Otherwise, the system remains in the microslip range, and the sequence jumps back to the step 308 where a new test axle is adjusted to the macroslip range.

Figure 3A:
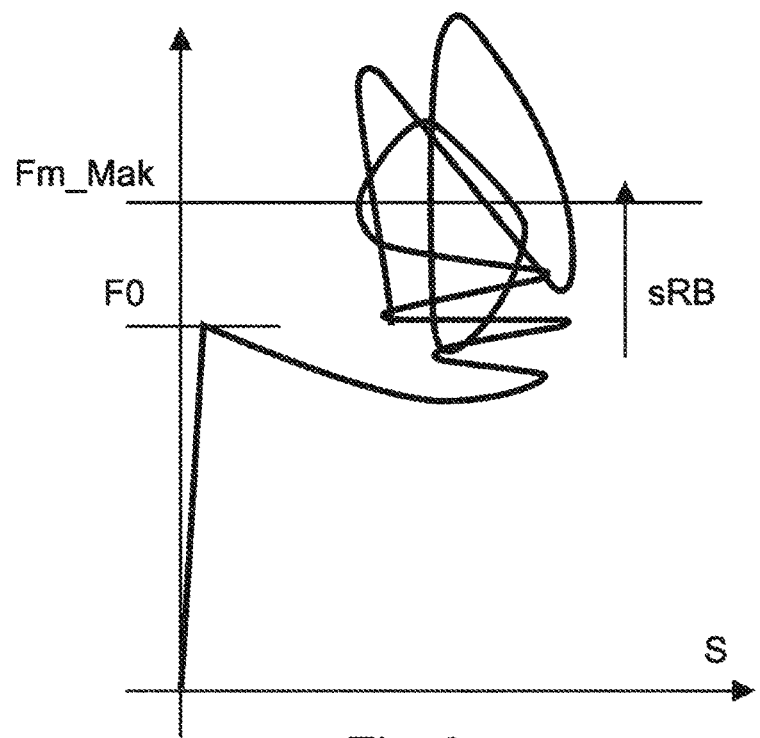
FIGS. 3a and 3b show exemplary qualitative profiles of an adhesion loading slip curve for different types of adhesion using the proposed anti-skid control.
Figure 3B:
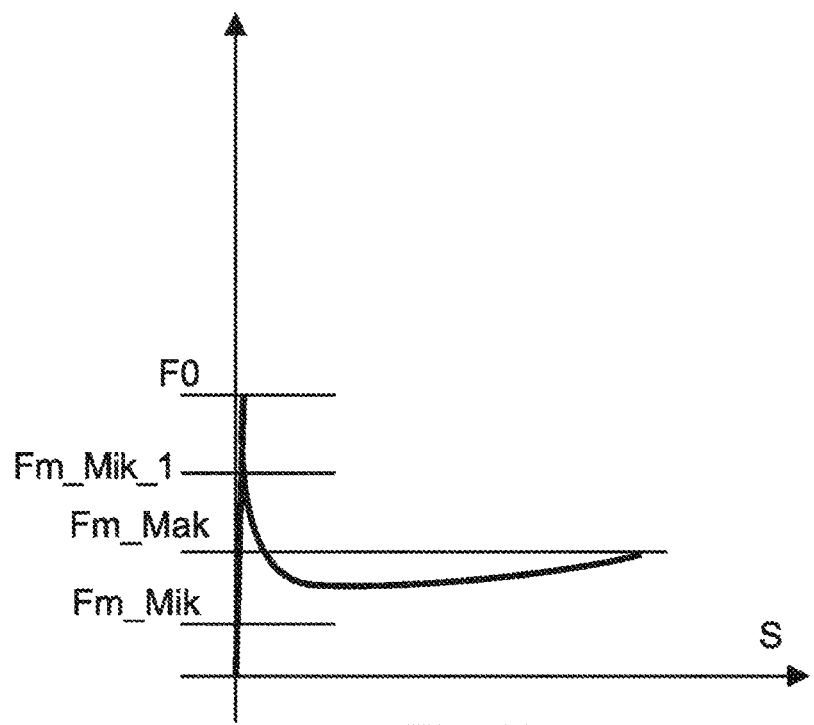

FIGS. 3a and 3b show for example qualitative profiles of an adhesion loading slip curve for different types of adhesion using the proposed anti-skid control, wherein the horizontal axis corresponds to the slip S and the vertical axis corresponds to the adhesion loading.

The anti-skid control in the macroslip range starts in FIG. 3a. As the slip S increases, the adhesion loading rises steeply, and drops slowly after an at least local maximum value (which corresponds to the maximum available force F0 in the microslip range) has been reached. If the slip rises further, the brake system becomes unstable, and the anti-skid adjustment intervenes to a greater extent. Depending on the friction conditions at the wheel-rail contact point, a continuingly changing ratio between the slip and the adhesion occurs under the influence of the anti-skid control or traction control. The time profile of these changes is shown by the complex progression at the top of FIG. 3a. The arrow in FIG. 3a represents the increase in the friction travel sRB which is determined by summing the product of the differential speed between the wheel set and the vehicle and the time.

In addition, in FIG. 3a an average braking force Fm_Mak in the macroslip range is also indicated on the vertical axis, the braking force Fm_Mak being determined by filtering and averaging of the change in time in the braking forces which are achieved by means of the anti-skid control and traction control. This average braking force can be used according to the disclosed embodiments for a decision about the change-over between the macroslip range and the microslip range, as has been explained above. In the exemplary adhesion scenario in FIG. 3a, the average braking force in the macroslip range exceeds the maximum available force F0 in the microslip range. The anti-skid control would therefore retain the macroslip range here.

In FIG. 3b, another exemplary adhesion scenario is illustrated. The anti-skid control starts again the microslip range. The adhesion loading also rises steeply here as the slip S increases and drops after an available maximum force F0 has been reached. The adhesion loading is lower here owing to lower friction at the wheel-rail contact point. A rise in the average braking force Fm_Mak in the macroslip range which is significant with the introduced friction travel does not take place here. Since Fm_Mak is significantly smaller than the force F0 which is available in the microslip range, the anti-skid adjustment will firstly adjust the system into the microslip range.

In a first case, the average braking force Fm_Mak in the macroslip range is greater than the average braking force Fm_Mik in the microslip range. The anti-skid adjustment will therefore in the first case reset the system back to the macroslip range in so far as this comparison result remains valid even in the case of averaging over all the axles operated in the macroslip range and all the axles operated in the microslip range.

In a second case, the average braking force Fm_Mak in the macroslip range is smaller than the average braking force Fm_Mik_1 which is determined here in the microslip range. The anti-skid adjustment will therefore continue to operate the system with microslip in the second case in so far as this comparison result remains valid even in the case of averaging over all the axles operated in the macroslip range and all the axles operated in the microslip range.

The different average braking forces Fm_Mik and Fm_Mik_1 in the microslip range can be, for example, the result of a different efficiency level of the microslip adjustment.

Figure 4:
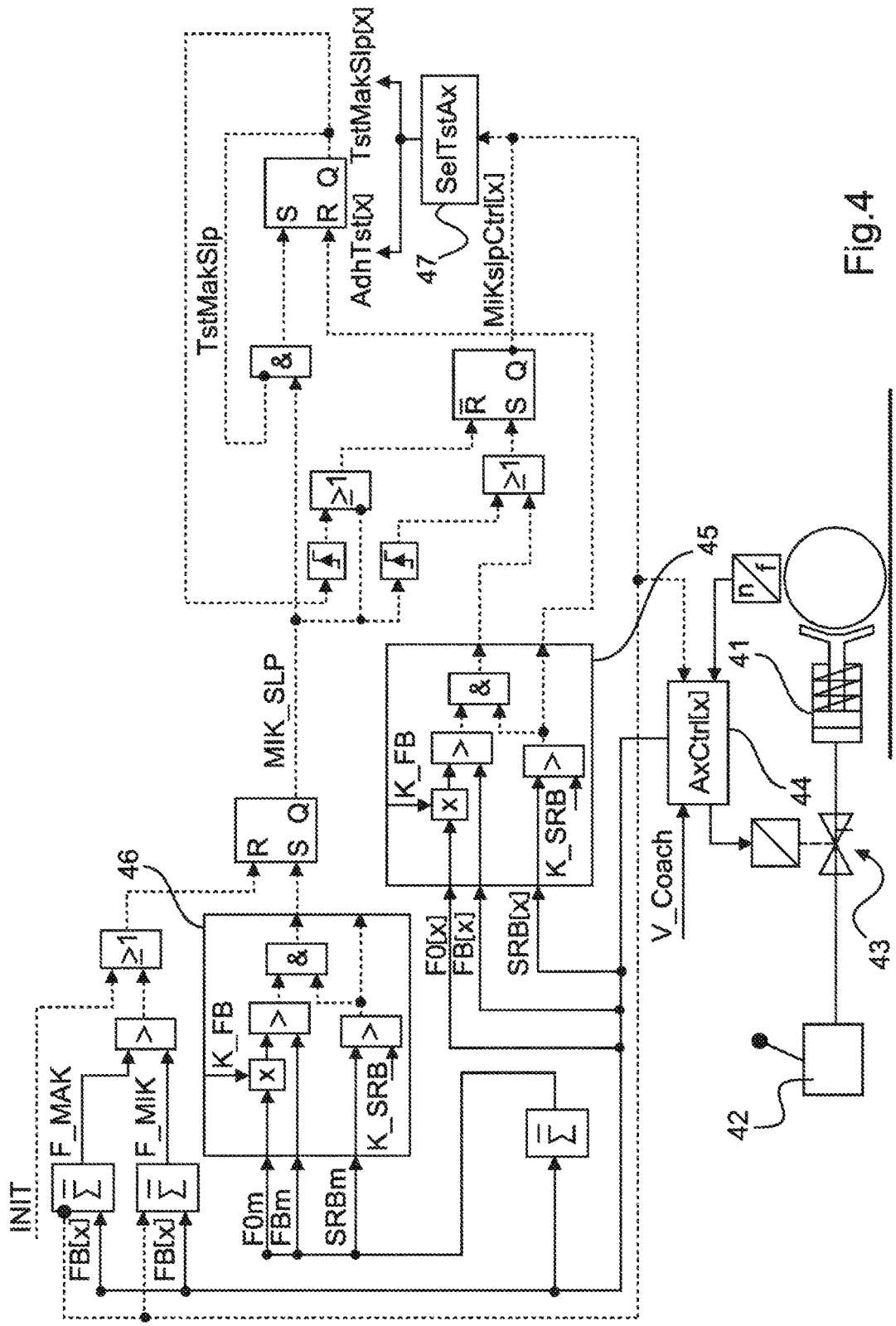
FIG. 4 shows a schematic functional block diagram of anti-skid control with an adaptation function according to a second exemplary embodiment

FIG. 4 shows a functional block diagram of an anti-skid control device with adaptation function according to a second exemplary embodiment.

The functional block diagram comprises a multiplicity of logic connection elements and bistable flipflops by means of which the desired control function is implemented.

The brake system can be controlled manually by means a brake lever device 42. The brake lever device controls a valve device 43 which applies compressed air to a piston 41 of a brake device. An anti-skid control block 44 carries out anti-skid control by corresponding actuation of the valve device 43.

The system states of the macroslip (binary parameter MIK_SLP in the "FALSE" state) and microslip (binary parameter MIK_SLP in the "TRUE" state) at the output of the average RS-flipflop to the right of the block 46 are differentiated. The state at the output of this system state flipflop therefore indicates whether the macroslip range or the microslip range is activated.

When the system is initialized by means of the parameter INIT (top left in FIG. 4), which is set to "TRUE", the system state flipflop is reset by means of an OR element ("≥1") which is connected to the reset input (R) of the flipflop. Consequently, the parameter MIK_SLP is set to the "FALSE" state and the system operates in the macroslip range at the start. In the macroslip state, all the adjustment channels (AxCtrl[x]) of the anti-skid control block 44 operate with proven conventional macroslip target values. Consequently, the microslip target value parameter MiKslpCtrl[x] at the negated output of the RS-flipflop to the left of the block 47 is set to the logic state "FALSE". The average summed forces (F0m, FBm) and the summed friction travel (SRBm) are formed by averaged sum formation over the individual wheel-rail contact values, made available by the anti-skid control block 44, of the force F0[x] available in the microslip range, the current braking force FB[x] and the friction travel SRB[x]) of the respective adjustment channels in a summing element.

The assessment of the effectiveness of the macroslip adjustment is carried out when a sufficient friction travel (SRBm) is present, by comparing the achieved force (FBm) with the force (F0m) which is potentially available in the microslip range, in the system comparison block 46. As long as a sufficient macroslip effect is present, the system state flipflop is not set via its setting input (S), and the parameter MIK_SLP remains in the "FALSE" state, since the system is then to remain in the macroslip state. Given an insufficient macroslip effect, the system state flipflop is set owing to the change of the logic state at the output of the comparison block 46, and the system changes into the microslip state owing to the resulting change in the state of the parameter MIK_SLP to "TRUE".

In the microslip state, all the adjustment channels firstly start in the microslip range (parameter MiKslpCtrl[x] in the "TRUE" state). In parallel with this, an axle (AdhTst[x]) which is selected by means of a test axle selection block 47 is always in a test phase (TstMakSlp[x]) with the macroslip state adjustment (parameter MiKslpCtrl[x] in the state "FALSE").

If the assessment of the effectiveness of the macroslip control is possible for the test axle (TstMakSlp[x]), the axle exits the test phase, and the possibility of the axle remaining in the macroslip range is assessed. The assessment takes place in the axle comparison block 45 according to the same rules as at the system level, but on an axle basis. The axle automatically decides, after exiting the test phase, about the possibility of remaining in the macroslip (parameter MiKslpCtrl[x] in the state "FALSE").

In the microslip state, mixed operation of axles in the microslip range and in the macroslip range therefore occurs, with different distribution depending on the adhesion situation.

An averaged value (F_MIK) of the achieved braking forces of the axles in the microslip range is compared with an averaged value (F_MAK) of the achieved braking forces of the axles in the macroslip range in a comparator element (">") top left in FIG. 4. If the braking forces of the macroslip axles exceed those of the microslip axles, the system state flipflop is reset by means of the OR element, the microslip state is exited, and the system changes into the macroslip state.

Finally, it is also to be noted that the control in the exemplary embodiments described above can also start in the reverse sequence. That is to say the control firstly places the system in the microslip system state, and then checks whether the macroslip system state brings about sufficient braking power (i.e. relatively high or at least equivalent). Such a procedure may be appropriate, for example, in a different situation with respect to standards.

In summary, a device and a method for adaptively actuating a brake system of a rail vehicle are described, wherein the brake system is controlled in accordance with a predetermined first and second slip parameter range, wherein the first slip parameter range is a macroslip range with a relatively high permissible slip range, and the second slip parameter range is a microslip range with a relatively low permissible slip range, and wherein a maximum available braking force in the microslip range and an average braking force, achieved in the current slip range, of the brake system are determined. A transition from the macroslip range into the microslip range is brought about if a comparison of the determined average braking force in the macroslip range with the maximum available braking force in the microslip range indicates an insufficient slipping effect. Alternatively, a transition from the microslip range into the macroslip range can be brought about if a comparison of the specific average braking force in the macroslip range with the maximum available braking force in the microslip range indicates a sufficient slipping effect.

The features of the disclosed embodiments which are disclosed in the description above, in the drawings and in the claims can be essential to the effect of the invention both individually and in any desired combination.

The invention claimed is:

1. A device for adaptively actuating a brake system of a rail vehicle by an anti-skid control function which prevents locking of a wheel of the rail vehicle under unfavorable adhesion conditions in the wheel-rail contact in that the anti-skid control function controls the brake system in accordance with a predetermined first and second slip parameter range, wherein the first slip parameter range is a macroslip range with relatively high permissible slip range, and the second slip parameter range is a microslip range with a relatively low permissible slip range, wherein the device comprises:
   a processor configured to:
   determine a maximum available braking force in the microslip range;
   determine an average braking force, achieved in the current slip range, of the brake system;
   compare the determined average braking force in the macroslip range with the maximum available braking force in the microslip range; and
   set the macroslip range or the microslip range;
   wherein, in response to a comparison result indicating an insufficient slipping effect in the macroslip range, the device is configured to bring about a transition from the macroslip range into the microslip range, or
   wherein, in response to a comparison result indicating a sufficient slipping effect in the macroslip range, the device is configured to bring about a transition from the microslip range into the macroslip range.

2. The device of claim 1, wherein the device is configured to bring about the comparison by the comparison means in response to achieving a predetermined friction travel.

3. The device of claim 2, wherein the device is configured to determine the friction travel as a product of a time and a differential speed between the wheel and the rail vehicle.

4. The device of claim 1, wherein the device is configured to leave, during a transition into the microslip range, at least one axle of the rail vehicle in the macroslip range as a test axle for a test phase.

5. The device of claim 4, wherein the device is configured to end the test phase of the test axle when a predetermined introduced friction travel or a maximum test time is reached.

6. The device of claim 4, wherein the device is configured to actuate the slip range-setting means to end the macroslip range of the test axle in response to an average braking force at the test axle being lower than a maximum braking force which is available in the microslip range and is evaluated with a factor.

7. The device of claim 1, wherein the device is further configured to compare an average braking force of axles operated in the macroslip range with an average braking force of axles operated in the microslip range, and wherein the device operates all the axles of the brake system in the macroslip range in response to the average braking force of the axles which are operated in the macroslip range exceeding the average braking force of the axles which are operated in the microslip range, or to operate all the axles of the brake system in the microslip range in response to the average braking force of the axles operated in the microslip range exceeding the average braking force of the axles operated in the macroslip range.

8. The device of claim 7, wherein the device is configured in such a way that the average braking force of the axles is determined by summing the average braking forces of the respective axles.

9. The device of claim 1, wherein the maximum force-determining means are configured to determine the maximum braking force available in the microslip range at complete transition of the wheel-rail contact into a skidding phase by correlation with the force necessary for this purpose.

10. A method for adaptively actuating a brake system of a rail vehicle in such a way that locking of a wheel of the rail vehicle under unfavorable adhesion conditions in the wheel-rail contact is prevented, wherein the brake system is controlled in accordance with a predetermined first and second slip parameter range, wherein the first slip parameter range is a macroslip range with a relatively high permissible slip range, and the second slip parameter range is a microslip range with a relatively low permissible slip range, wherein the method comprising:

determining a maximum available braking force in the microslip range;

determining an average braking force, achieved in the current slip range, of the brake system;

comparing the determined average braking force in the macroslip range with the maximal available braking force in the microslip range; and bringing about a transition from the macroslip range into the microslip range in response to a comparison result of the comparison step indicating an insufficient slipping effect in the macroslip range, or bringing about a transition from the microslip range into the macroslip range in response to a comparison result of the comparison step indicating a sufficient slipping effect in the macroslip range.

11. A non-transitory computer program product having code means for carrying out the operations as claimed in patent claim 10 when the program is executed on a computer device.

* * * * *